US011509105B2

(12) United States Patent
Font Aranega et al.

(10) Patent No.: US 11,509,105 B2
(45) Date of Patent: Nov. 22, 2022

(54) CONNECTOR WITH SEPARABLE LACING FIXTURE

(71) Applicant: CommScope Connectivity Spain, S.L., Madrid (ES)

(72) Inventors: Albert Font Aranega, Barcelona (ES); Longinos De Dios Martín, Barcelona (ES); Antonio Carreras Garciá, Barcelona (ES)

(73) Assignee: CommScope Connectivity Spain, S.L., Madrid (ES)

( * ) Notice: Subject to any disclaimer, the term of this patent is extended or adjusted under 35 U.S.C. 154(b) by 67 days.

(21) Appl. No.: 17/026,928

(22) Filed: Sep. 21, 2020

(65) Prior Publication Data

US 2021/0143600 A1 May 13, 2021

Related U.S. Application Data

(63) Continuation of application No. 15/560,117, filed as application No. PCT/ES2016/070190 on Mar. 21, 2016, now Pat. No. 10,784,640.

(30) Foreign Application Priority Data

Mar. 20, 2015 (ES) .................................. 201530372

(51) Int. Cl.
*B23P 19/00* (2006.01)
*H01R 43/01* (2006.01)
(Continued)

(52) U.S. Cl.
CPC ......... *H01R 43/015* (2013.01); *H01R 13/504* (2013.01); *H01R 24/64* (2013.01); *H01B 15/00* (2013.01); *H01R 4/2433* (2013.01)

(58) Field of Classification Search
CPC .... H01R 4/2433; H01R 13/504; H01R 24/64; H01R 43/015; H01B 15/00
See application file for complete search history.

(56) References Cited

U.S. PATENT DOCUMENTS 3,666,996 A 5/1972 Brown
3,739,076 A 6/1973 Schwartz
(Continued)

FOREIGN PATENT DOCUMENTS

CN 101095264 A 12/2007
CN 101510649 A 8/2009
(Continued)

OTHER PUBLICATIONS

Extended European Search Report for Application No. 18875839.5 dated Jul. 19, 2021.

(Continued)

*Primary Examiner* — Paul D Kim
(74) *Attorney, Agent, or Firm* — Merchant & Gould P.C.

(57) ABSTRACT

A connector assembly has a connector part and a cable manager part. The cable manager part can be provided with a separable lacing fixture that functions to retain the severed portions of the wires that result from the termination process, rather than allowing the severed wire portions to fall to the floor in an uncollected state. In one aspect, the cable manager part has a main body to which the separable lacing fixture is attached via a plurality of breakaway portions.

20 Claims, 14 Drawing Sheets

(51) Int. Cl.

| | |
|---|---|
| ***H01R 24/64*** | (2011.01) |
| ***H01R 13/504*** | (2006.01) |
| *H01R 4/2433* | (2018.01) |
| *H01B 15/00* | (2006.01) |

(56) References Cited

U.S. PATENT DOCUMENTS 3,830,957 A 8/1974 Oberdiear
4,284,316 A 8/1981 Debaigt
4,537,458 A 8/1985 Worth
4,660,912 A 4/1987 Tomek
4,679,879 A 7/1987 Triner et al.
4,721,476 A 1/1988 Zeliff et al.
4,747,785 A 5/1988 Roberts et al.
4,760,215 A 7/1988 Cook et al.
4,790,765 A 12/1988 Ehrenfels et al.
4,810,210 A 3/1989 Komatsu
4,824,400 A 4/1989 Spinner
4,830,628 A 5/1989 Dyson et al.
4,842,553 A 6/1989 Ingram
4,857,015 A 8/1989 Michaels et al.
5,021,610 A 6/1991 Roberts
5,169,346 A 12/1992 Johnston
5,238,416 A 8/1993 Dickie
5,240,436 A 8/1993 Bradley et al.
5,278,352 A 1/1994 Schade
5,310,359 A 5/1994 Chadbourne et al.
5,445,538 A 8/1995 Rodrigues et al.
5,571,023 A 11/1996 Anthony
5,675,126 A 10/1997 Halvorsen
5,691,506 A 11/1997 Miyazaki et al.
5,697,806 A 12/1997 Whiteman, Jr. et al.
5,762,517 A 6/1998 Abe
5,769,647 A 6/1998 Tulley et al.
6,015,307 A 1/2000 Chiu et al.
6,077,122 A 6/2000 Elkhatib et al.
6,086,415 A 7/2000 Sanchez et al.
6,244,908 B1 6/2001 Hammond et al.
6,247,849 B1 6/2001 Liu
6,254,403 B1 7/2001 Bernardini
6,292,564 B1 9/2001 Cowan et al.
6,354,851 B1 3/2002 Bachle
6,386,915 B1 5/2002 Nelson
6,394,853 B1 5/2002 Hammond et al.
6,425,694 B1 7/2002 Szilagyi et al.
6,520,781 B2 2/2003 Koide et al.
6,537,104 B1 3/2003 Hagmann et al.
6,612,750 B1 9/2003 Bull et al.
6,652,152 B2 11/2003 Fang et al.
6,702,477 B1 3/2004 Ngo
6,848,833 B1 2/2005 Kamarauskas et al.
6,866,541 B2 3/2005 Barker et al.
6,872,090 B2 3/2005 De Dios Martin
7,029,182 B2 4/2006 Ngo
7,033,219 B2 4/2006 Gordon et al.
7,087,840 B2 8/2006 Herring et al.
7,112,090 B2 9/2006 Caveney et al.
7,156,696 B1 1/2007 Montena
7,207,846 B2 4/2007 Caveney et al.
7,220,145 B2 5/2007 Denovich et al.
7,273,383 B1 9/2007 Bennett
7,329,139 B2 2/2008 Benham
7,340,146 B2 3/2008 Lampert et al.
7,384,298 B2 6/2008 Caveney et al.
7,416,448 B2 8/2008 Gaidosch
7,476,120 B2 1/2009 Patel et al.
7,510,421 B2 3/2009 Fransen et al.
7,621,772 B1 11/2009 Tobey
7,628,644 B1 12/2009 Peluffo
7,628,657 B2 12/2009 Martich
7,637,769 B2 12/2009 Carreras Garcia et al.
7,645,160 B2 1/2010 Tabet
7,676,133 B2 3/2010 Lampert et al.
7,727,013 B1 6/2010 Paynter
7,766,688 B2 8/2010 Mateo Ferrus et al.
7,806,721 B2 10/2010 Herndon et al.
7,819,698 B2 10/2010 Islam
7,854,624 B1 12/2010 Pepe
7,857,663 B2 12/2010 Chantrell et al.
7,871,285 B1 1/2011 Tobey et al.
7,874,865 B2 1/2011 Tobey
7,909,622 B2 3/2011 Pepe et al.
7,938,680 B1 5/2011 Hsieh
7,955,120 B2 6/2011 Patel et al.
8,057,249 B1 11/2011 Tobey et al.
8,070,506 B2 12/2011 De Dios Martin et al.
8,075,344 B2 12/2011 Shih
8,109,784 B2 2/2012 Patel et al.
8,241,055 B2 8/2012 Chen
8,376,786 B2 2/2013 Carreras Garcia et al.
8,454,383 B2 6/2013 Paynter et al.
8,747,126 B2 6/2014 Corbett et al.
8,758,065 B2 6/2014 Fransen et al.
8,791,374 B1 7/2014 Smith
8,834,196 B2 9/2014 Duran et al.
9,022,792 B2 5/2015 Sticker et al.
9,583,885 B2 2/2017 Ruesca Fernandez
9,627,827 B2 4/2017 Bragg
9,640,898 B1 5/2017 Wubbels
9,768,556 B2 9/2017 Bopp et al.
9,847,607 B2 12/2017 Bopp et al.
10,476,212 B2 11/2019 Bopp et al.
10,522,939 B2 12/2019 De Dios Martin
10,594,088 B2 3/2020 Cupples et al.
10,651,608 B2 5/2020 White
10,777,953 B2 9/2020 White et al.
10,784,640 B2 9/2020 Font Aranega et al.
10,958,012 B2 3/2021 De Dios Martin
2002/0058432 A1 5/2002 Chen et al.
2002/0119681 A1 8/2002 Follingstad et al.
2003/0081907 A1 5/2003 Malagrino, Jr. et al.
2004/0038582 A1 2/2004 Clement
2004/0229501 A1 11/2004 Caveney et al.
2005/0103672 A1 5/2005 Peng
2005/0159036 A1 7/2005 Caveney et al.
2005/0201071 A1 9/2005 AbuGhazaleh et al.
2006/0110986 A1 5/2006 King, Jr. et al.
2006/0204200 A1 9/2006 Lampert et al.
2007/0054521 A1 3/2007 John
2007/0240902 A1 10/2007 Tapper
2008/0090461 A1 4/2008 Pepe et al.
2008/0096438 A1 4/2008 Clark et al.
2008/0102686 A1 5/2008 Carreras Garcia et al.
2008/0268719 A1 10/2008 Siemon et al.
2008/0311800 A1 12/2008 Tsai Wu
2009/0004913 A1 1/2009 Caveney et al.
2009/0034226 A1 2/2009 Herndon et al.
2009/0243757 A1 10/2009 Xu et al.
2009/0258545 A1 10/2009 Pepe et al.
2009/0274422 A1 11/2009 Henry et al.
2009/0311904 A1 12/2009 Chen
2009/0318033 A1 12/2009 Tobey
2010/0151707 A1 6/2010 AbuGhazaleh et al.
2010/0216335 A1 8/2010 Cobb
2010/0255716 A1 10/2010 Frey et al.
2011/0030343 A1 2/2011 Kiser et al.
2011/0038581 A1 2/2011 Mudd et al.
2011/0097924 A1 4/2011 Chen
2011/0115494 A1 5/2011 Taylor et al.
2011/0304343 A1 12/2011 Font Aranega et al.
2012/0196472 A1 8/2012 Fitzpatrick
2012/0226807 A1 9/2012 Panella et al.
2012/0244736 A1 9/2012 Duran et al.
2012/0244752 A1 9/2012 Patel et al.
2012/0322307 A1 12/2012 Kudo
2013/0203291 A1 8/2013 Sticker et al.
2013/0210264 A1 8/2013 Rynaski et al.
2013/0217249 A1 8/2013 Patel et al.
2013/0260582 A1 10/2013 White
2014/0080354 A1 3/2014 Caveney et al.
2014/0242855 A1 8/2014 Kan et al.
2014/0287609 A1 9/2014 Fransen et al.
2014/0335726 A1 11/2014 Zhang
2015/0349468 A1 12/2015 Singer et al.

(56) References Cited

U.S. PATENT DOCUMENTS

| | | | |
|---|---|---|---|
| 2016/0080836 | A1 | 3/2016 | Carreras Garcia |
| 2016/0248197 | A1 | 8/2016 | Fransen et al. |
| 2016/0285205 | A1* | 9/2016 | Ruesca Fernandez ...................... H01R 24/64 |
| 2017/0229825 | A1 | 8/2017 | Baines et al. |
| 2017/0302040 | A1 | 10/2017 | Taylor et al. |
| 2018/0287312 | A1 | 10/2018 | De Dios Martin et al. |
| 2018/0358739 | A1 | 12/2018 | De Dios Martin |
| 2020/0137465 | A1 | 4/2020 | White et al. |
| 2020/0244003 | A1 | 7/2020 | De Dios Martin |
| 2020/0267862 | A1 | 8/2020 | Taguchi et al. |
| 2020/0351573 | A1 | 11/2020 | Shih |
| 2021/0104850 | A1 | 4/2021 | White et al. |
| 2021/0281009 | A1 | 9/2021 | De Dios Martin |

FOREIGN PATENT DOCUMENTS

| | | | |
|---|---|---|---|
| CN | 201303074 | Y | 9/2009 |
| CN | 201741918 | U | 2/2011 |
| CN | 201774068 | U | 3/2011 |
| CN | 202025948 | U | 11/2011 |
| CN | 102957034 | A | 3/2013 |
| CN | 203218574 | U | 9/2013 |
| CN | 103384042 | A | 11/2013 |
| DE | 101 13 230 | A1 | 9/2002 |
| EP | 0 073 112 | A1 | 3/1983 |
| EP | 0 775 845 | A2 | 5/1997 |
| EP | 1 189 085 | A2 | 3/2002 |
| EP | 1 422 793 | A1 | 5/2004 |
| EP | 1 443 608 | A2 | 8/2004 |
| EP | 1 484 824 | A2 | 12/2004 |
| EP | 2 133 957 | A1 | 12/2009 |
| ES | 2 178 813 | T3 | 1/2003 |
| ES | 2 257 514 | T3 | 8/2006 |
| ES | 1 138 538 | U | 4/2015 |
| ES | 2 583 636 | A1 | 9/2016 |
| ES | 2 584 539 | A1 | 9/2016 |
| ES | 2 600 968 | A1 | 2/2017 |
| FR | 2 701 007 | A1 | 8/1994 |
| FR | 2 893 454 | A1 | 5/2007 |
| GB | 221 872 | | 9/1924 |
| GB | 2 260 660 | A | 4/1993 |
| GB | 2 308 508 | A | 6/1997 |
| GB | 2 457 982 | A | 9/2009 |
| GB | 2 469 123 | A | 10/2010 |
| JP | 2001-244029 | A | 9/2001 |
| JP | 2006-126807 | A | 5/2006 |
| JP | 2007-299620 | A | 11/2007 |
| JP | 2007-313060 | A | 12/2007 |
| JP | 2013-235783 | A | 11/2013 |
| KR | 2001-0100594 | A | 11/2001 |
| KR | 20-2010-0008888 | U | 9/2010 |
| TW | M349117 | U | 1/2009 |
| WO | 95/34923 | A1 | 12/1995 |
| WO | 97/44862 | A1 | 11/1997 |
| WO | 99/19944 | A1 | 4/1999 |
| WO | 03/026076 | A1 | 3/2003 |
| WO | 2005/104300 | A1 | 11/2005 |
| WO | 2008/059203 | A2 | 5/2008 |
| WO | 2008/095830 | A1 | 8/2008 |
| WO | 2011/038387 | A1 | 3/2011 |
| WO | 2013/090201 | A1 | 6/2013 |
| WO | 2013/096279 | A1 | 6/2013 |
| WO | 2013/123154 | A1 | 8/2013 |
| WO | 2014/167449 | A1 | 10/2014 |
| WO | 2016/151172 | A1 | 9/2016 |
| WO | 2016/151177 | A1 | 9/2016 |
| WO | 2016/156643 | A1 | 10/2016 |
| WO | 2016/156644 | A1 | 10/2016 |
| WO | 2018/009698 | A1 | 1/2018 |
| WO | 2018/034870 | A1 | 2/2018 |
| WO | 2018/236875 | A1 | 12/2018 |
| WO | 2019/094558 | A1 | 5/2019 |

OTHER PUBLICATIONS

First Office Action for Chinese Patent Application No. 201880072621.7 dated Aug. 17, 2021, 21 pages.

International Search Report and Written Opinion of the International Searching Authority for International Patent Application No. PCT/US2018/059780 dated Mar. 4, 2019, 12 pages.

"Mini-Com All Metal Shielded Modular Patch Panels, Installation Instructions", Panduit, 2 pages (2010).

"Mini-Com® All Metal Shielded Modular Patch Panels, Installation Instructions, Specification Sheet", Panduit, 3 pages (2016).

Extended European Search Report for Application No. 17841856.2 dated Feb. 19, 2020.

Extended European Search Report for Application No. 2017844.9 dated Aug. 24, 2020.

Extended European Search Report for Application No. 18820793.0 dated Feb. 12, 2021.

International Search Report and Written Opinion for Application No. PCT/ES2016/070204 dated Jun. 6, 2016.

International Search Report and Written Opinion for Application No. PCT/ES2016/070212 dated Jun. 6, 2016.

International Search Report and Written Opinion for Application No. PCT/ES2016/070213 dated Jun. 7, 2016.

International Search Report and Written Opinion for Application No. PCT/EP2016/069310 dated Oct. 14, 2016.

International Search Report and Written Opinion for Application No. PCT/US2017/040947 dated Oct. 13, 2017.

International Search Report and Written Opinion for Application No. PCT/US2017/045539 dated Nov. 15, 2017.

International Search Report and Written Opinion for Application No. PCT/US2018/038295 dated Oct. 16, 2018.

International Search Report and Written Opinion for Application No. PCT/US2018/059775 dated Mar. 4, 2019.

Product Specifications: 1-1479191-3, SL Series Speaker Post Insert, red stripe, alpine white, CommScope, Inc., 1 page (Sep. 6, 2017).

State of the Art Report for Application No. 201530372 dated Mar. 20, 2015.

State of the Art Report for Application No. 201530377 dated Mar. 23, 2015.

State of the Art Report for Application No. 201530417 dated Mar. 27, 2015.

State of the Art Report for Application No. 201530418 dated Mar. 27, 2015.

State of the Art Report for Application No. 201530419 dated Mar. 27, 2015.

State of the Art Report for Application No. 201531199 dated Aug. 13, 2015.

International Search Report and Written Opinion of the International Searching Authority for corresponding International Patent Application No. PCT/ES2016/070190 dated Jul. 5, 2016, 10 pages.

* cited by examiner

CONNECTOR WITH SEPARABLE LACING FIXTURE

CROSS-REFERENCE TO RELATED APPLICATION

This application is a Continuation of U.S. patent application Ser. No. 15/560,117, filed on Sep. 20, 2017, now U.S. Pat. No. 10,784,640; which is a National Stage Application of PCT/ES2016/070190, filed on Mar. 21, 2016; which claims the benefit of Spanish Patent Application No. P201530372, filed on Mar. 20, 2015, the disclosures of which are incorporated herein by reference in their entireties. To the extent appropriate, a claim of priority is made to each of the above disclosed applications.

BACKGROUND

Electrical connectors are useful for providing a connection point for telecommunications systems. For example, RJ-type connectors can be provided as wall sockets wherein electronic data cables are terminated and mating electrical plugs can be inserted into the sockets. Frequently, this termination process occurs in the field and at the actual location where the cables to be attached to the connectors are being installed. In such instances, it is common that the excess wires created by the termination process are allowed to fall to the floor and must be collected afterwards. When many termination processes are conducted in the same area, which is common, a significant number of excess wires can accumulate which can be problematic.

SUMMARY

A connector assembly is disclosed. In one aspect, the connector assembly includes a connector part having a jack cavity and a cable manager part. The cable manager part can be configured to be installed within the connector part to form the connector assembly. In one example, the cable manager part has a main body having a central aperture for receiving a cable which has a plurality of wires and has a plurality of channels for receiving and retaining each of the wires. The cable manager part can also be provided with a separable lacing fixture removably attached to the main body which has a plurality of channels for receiving and retaining each of the wires. In one aspect, the separable lacing fixture is configured to be separated from the main body when the connector part is fully installed onto the main body and is further configured to retain the wires which are severed during the termination process such that a single component can be handled after the termination process is complete.

A method for terminating a connector to a plurality of wires of a cable is also disclosed. One step in the method can providing a cable manager part including a main body having a central aperture and a plurality of channels and including a separable lacing fixture removably attached to the main body and also having a plurality of channels. Another step can be inserting a cable having a plurality of wires through the main body central aperture. Other steps in the method can be retaining each of the plurality of wires within one of the main body channels and within one of the lacing fixture channels, partially inserting a connector part onto the cable manager part, and placing the connector part and the cable manager part within a wire termination tool. Another step can be actuating the wire termination tool to fully insert the connector part onto the cable manager part such that the wires are terminated within the connector part to form a connector and such that a portion of the wires and the separable lacing fixture are severed from the main body. Further steps can be removing the connector from the wire termination tool and removing the separable lacing fixture from the wire termination tool.

BRIEF DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
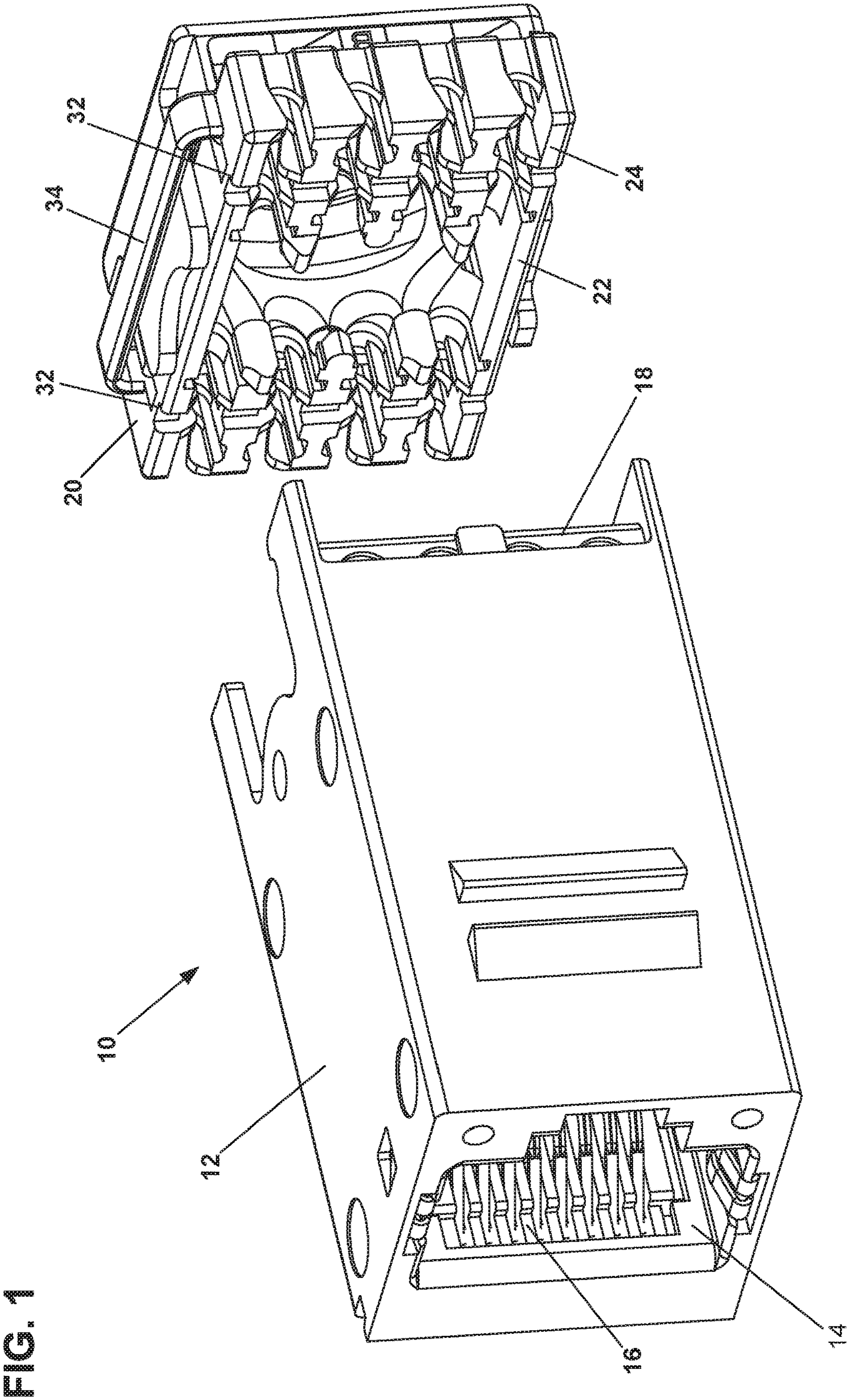
FIG. 1 is a perspective view of a telecommunications connector having a separated connector part and having a cable manager part including a separable lacing fixture having features that are examples of aspects in accordance with the principles of the present disclosure.
Figure 2:
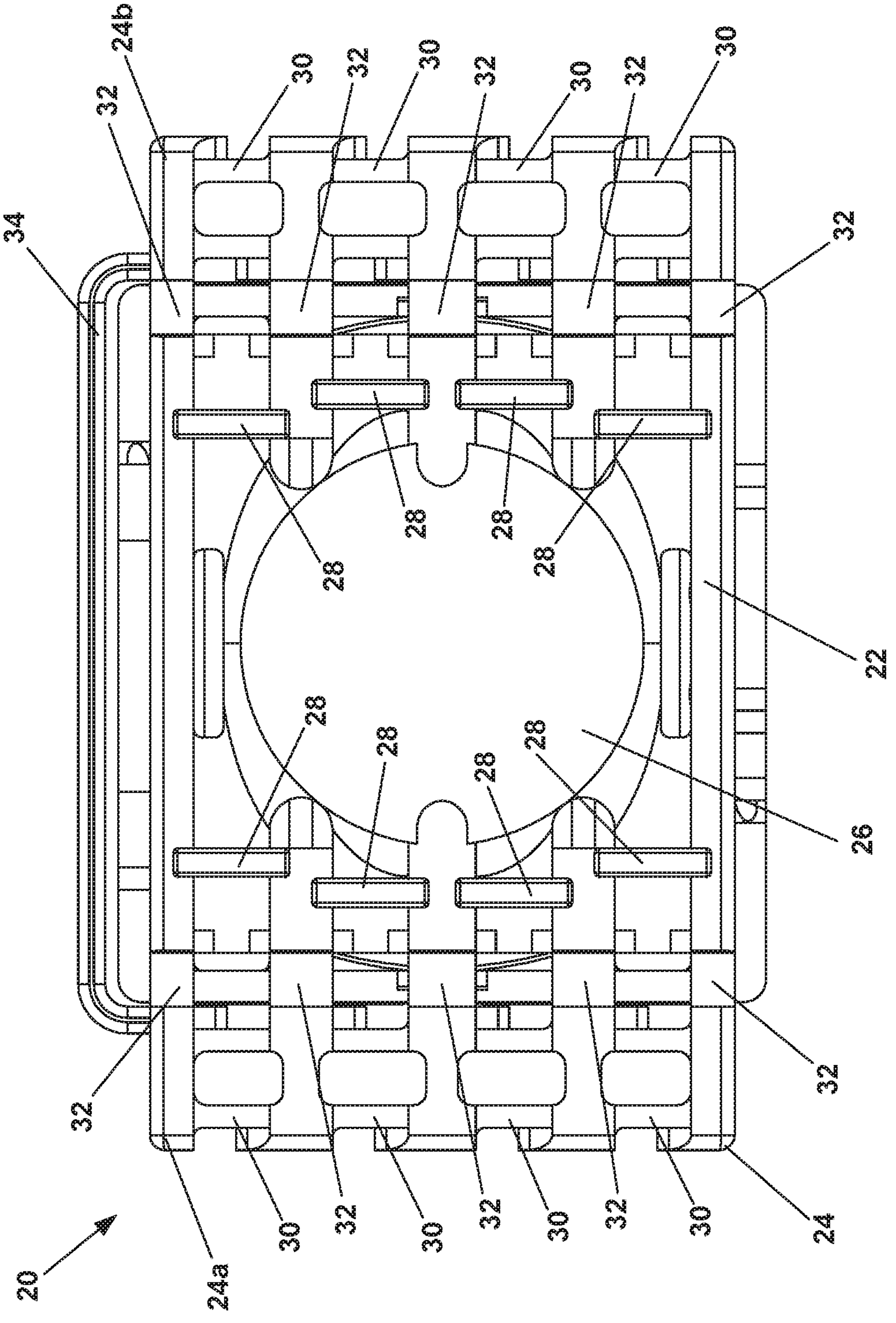
FIG. 2 is a top view of the cable manager part of the telecommunications connector shown in FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A telecommunications connector 10 for connection with a plurality of wires 6 from a cable 4 is shown. In one example, the cable 4 includes a plurality of insulated copper wires 6 while the connectors 10 are modular or RJ-type connectors. As shown, the telecommunications connector has a connector part 12 which includes a jack cavity 14 for receiving a corresponding plug (not shown). In one aspect the connector part 12 includes a plurality of electrical contact members 16 for which electrical connection to the wires 6 will be made through the below described termination process. The connector part 12 is further provided with a pair of cutting edges 18 which are designed to cut the wires 6 of the cable 4 during the termination process.

Figure 3:
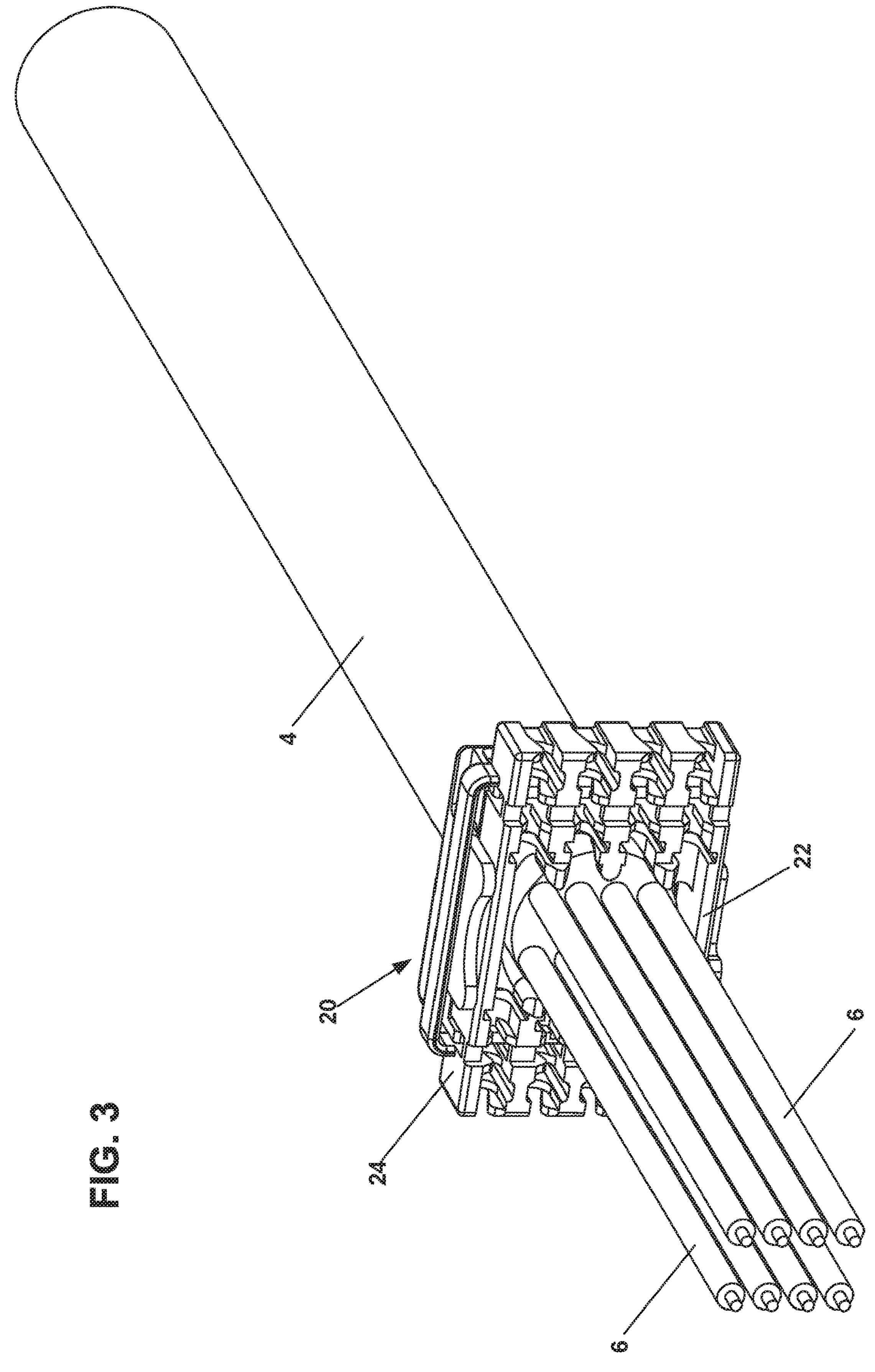
FIG. 3 is a perspective view of a cable having a plurality of insulated wires having been inserted through the cable manager part shown in FIG. 1.

The connector 10 is also provided with a cable manager part 20 having a main body 22 and an initially attached separable lacing fixture 24. The connector part 12 and the cable manager part 20 used in the various embodiments may be configured in a complementary manner, so that the connector part 12 is able to engage with the cable manager part 20 only in one orientation. As shown, the main body 22 is provided with a central aperture 26 through which the cable 4 and associated wires 6 extend. Referring to FIG. 3, the cable 4 has been stripped to expose eight insulated copper wires 6 and has been inserted through the central aperture 26 of the main body 22.

Figure 4:
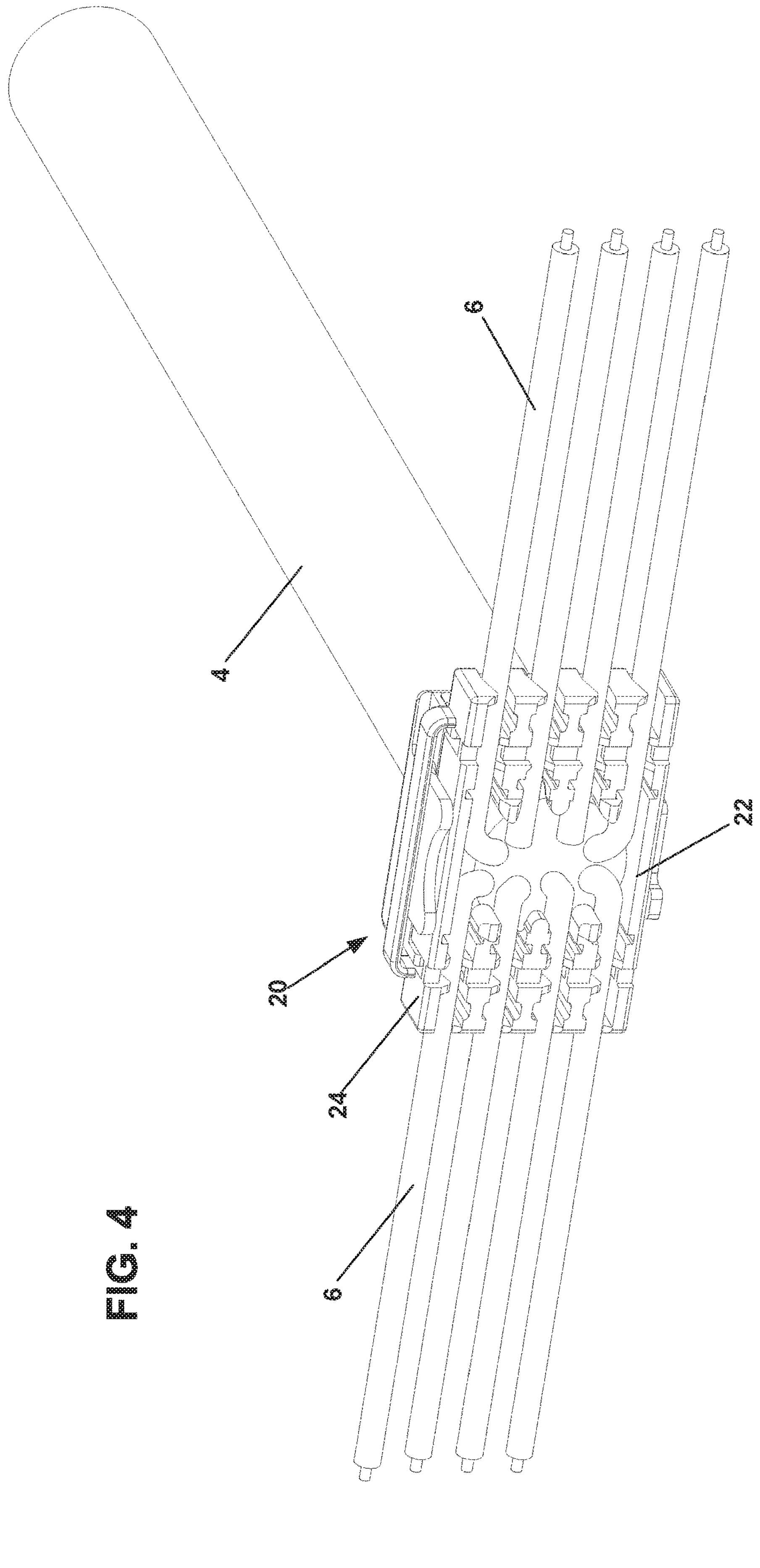
FIG. 4 is a perspective view of the cable and cable manager part shown in FIG. 3, wherein each of the insulated wires of the cable have been mounted to a separable lacing fixture of the cable manager part.

The main body 22 also includes a plurality of channels 28, each of which is configured to receive and retain an individual wire 6 of the cable 4. As shown, eight channels 28 are provided so as to accommodate a cable having eight wires 6. Aligned with the channels 28 of the main body are an equal number of lacing fixture channels 30 are also configured to receive and retain an individual wire 6. Accordingly, each wire 6 is received and retained by both a channel 28 and a channel 30. As shown at FIG. 4, the wires 6 have been oriented from the position shown in FIG. 3 to a position in which each wire 6 is held within corresponding channels 28 and 30.

Figure 5:
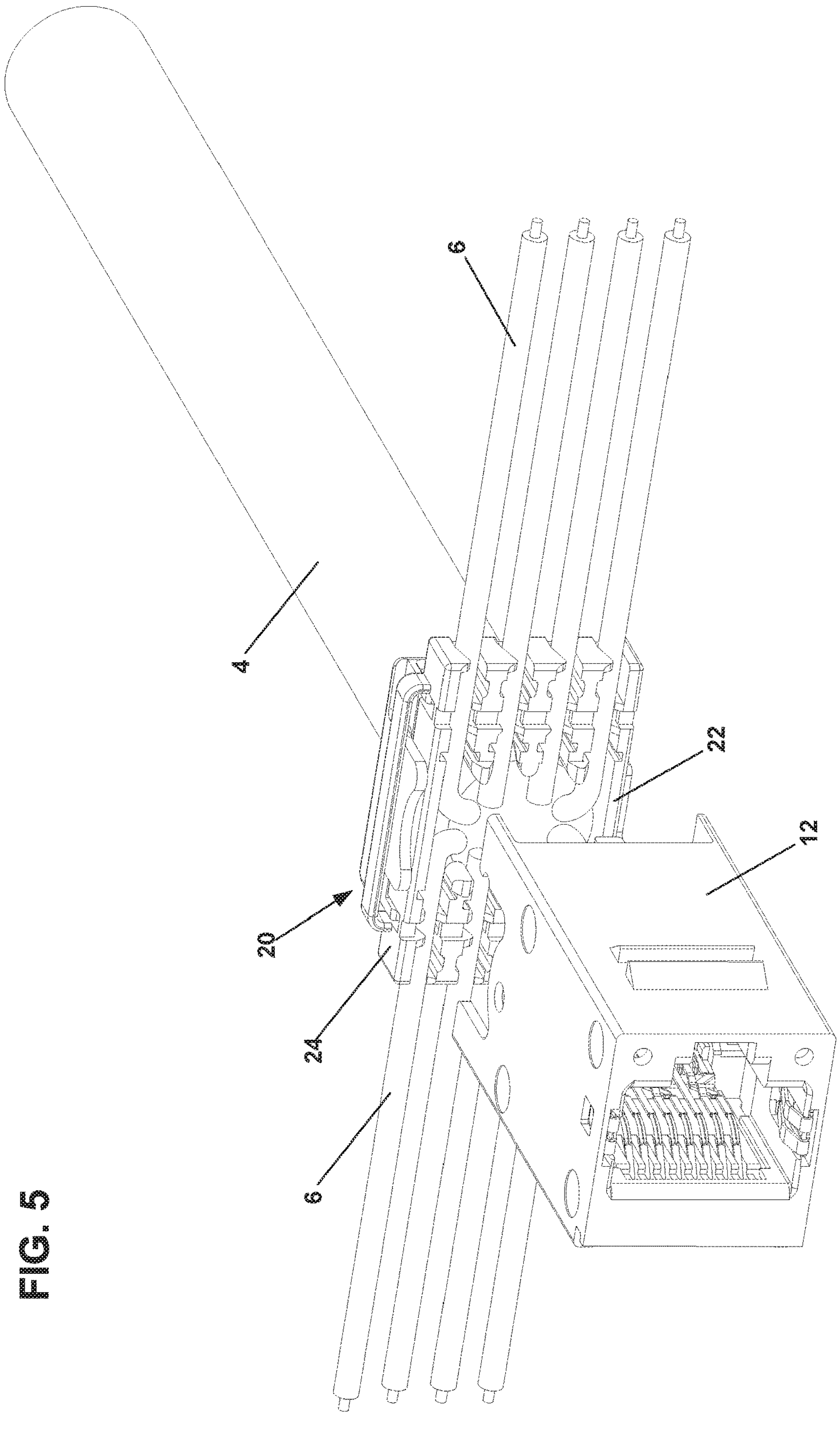
FIG. 5 is a perspective view of the cable manager part and cable shown in FIG. 4 with the connector part having been aligned with, but not inserted onto, the cable manager part.
Figure 6:
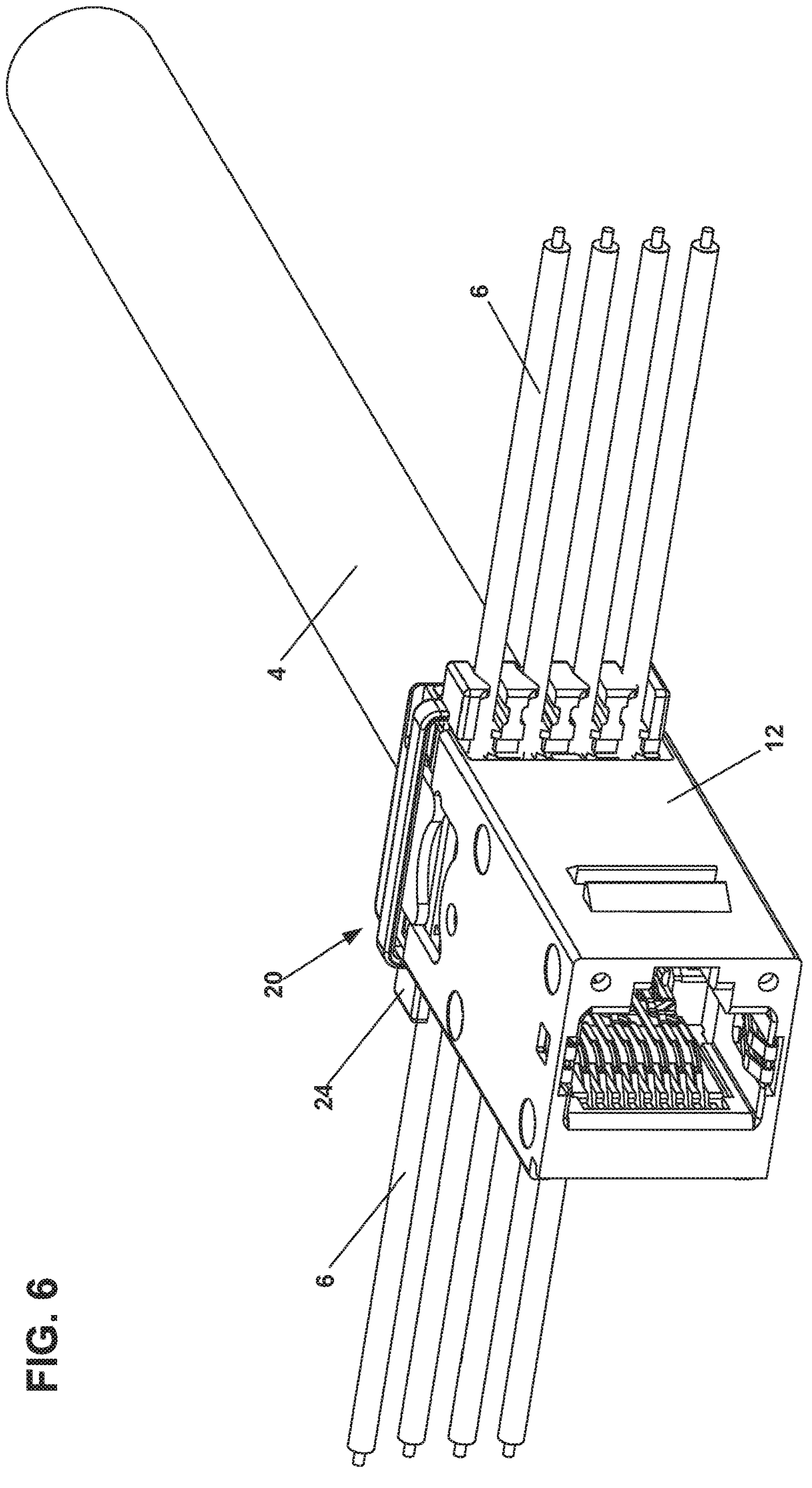
FIG. 6 is a perspective view of the connector and cable shown in FIG. 5 with the connector part having been partially installed onto the cable manager part.

As shown, the separable lacing fixture 24 is attached to the main body 22 via a plurality of breakaway portions 32 which extend one each side of the channels 30. The breakaway portions 32 are aligned such that the cutting edges 18 of the connector part 12 are aligned when the connector part 12 is attached to the cable manager part 20. Thus, when the connector part 12 is fully installed onto the cable manager part 20, the cutting edges 18 not only cut the wires 6, but also cut or break the breakaway portions 32, thereby separating the separable lacing fixture 24 from the main body 22. FIG. 5 shows the connector part 12 being initially aligned with the cable manager part 20 such that the cutting edges 18 and the breakaway portions 32 are aligned with each other. FIG. 6 shows the connector part 12 inserted onto the cable manager part 20, but not up to the point where the cutting edges 18 will sever the breakaway portions 32.

In one aspect, the separable lacing fixture 24 includes a first portion **24*a* and a mirror image second portion 24*b*, wherein each of the portions 24*a*, 24*b* has an equal number of channels 30 and breakaway portions 32. As shown, each portion 24*a*, 24*b* has four channels 30 and five aligned breakaway portions 32. The separable lacing fixture 24 may also be provided with a bridge portion 34 extending between the first and second portions 24*a*, 24*b*. The separable lacing fixture 24 may be provided with one bridge portion, two bridge portions, or no bridge portions. The bridge portion 34 allows the separable lacing fixture 24 to remain intact as a single component after the separable lacing fixture 24 has been separated from the main body 22**.

Wire Termination

Figure 7:
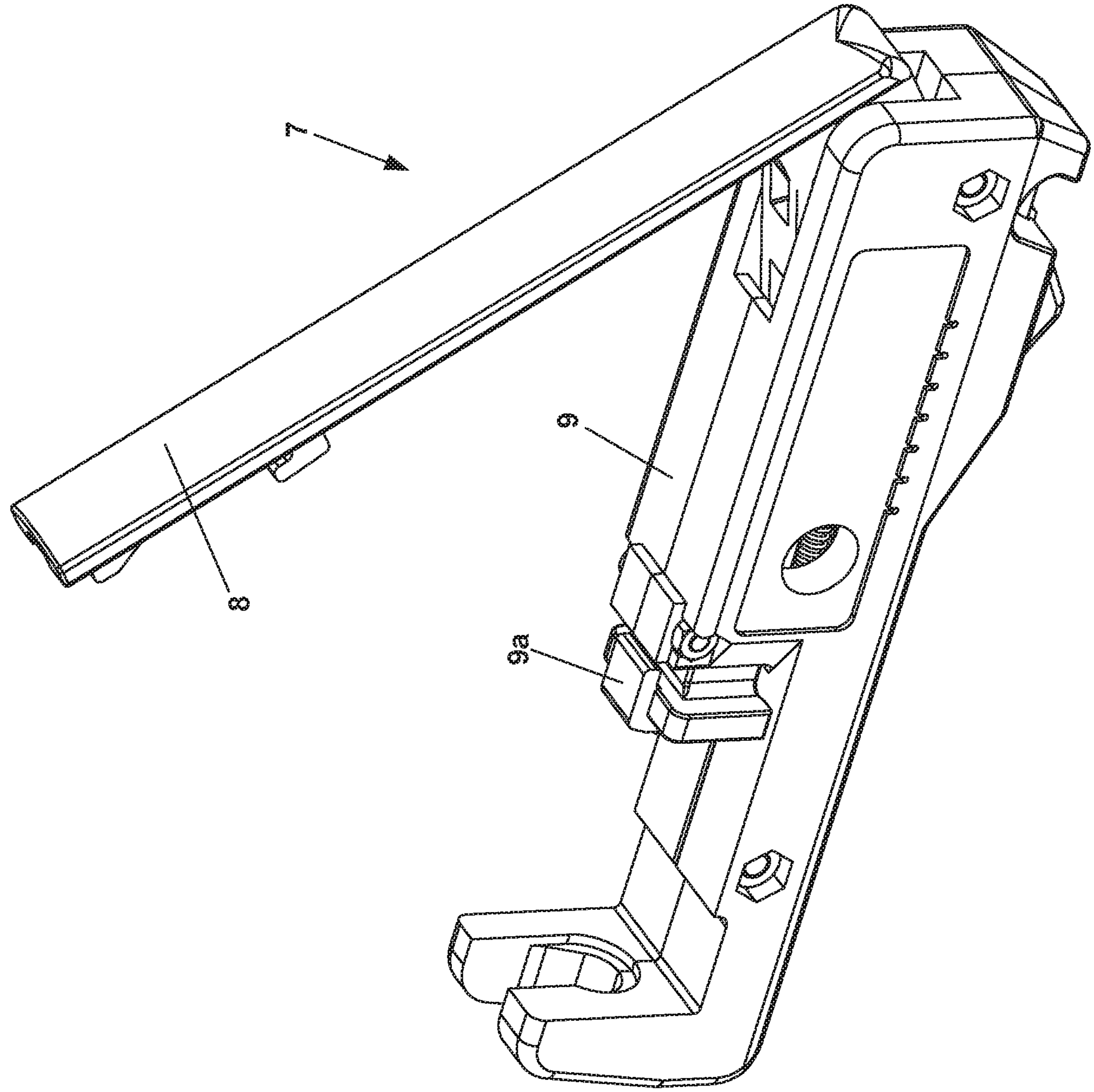
FIG. 7 is a perspective view of a wire termination tool in a retracted position.

A termination tool 7 is frequently used for the purpose of terminating the wires 6 to form the fully assembled connector 2. Such a tool 7 is shown at FIG. 7. Termination tools 7 are known and described in US Patent Application Publication 2011/0304343 A1 and in European Patent EP 1 484 824 B1, the entireties of which are herein incorporated by reference. As shown, the termination tool 7 may be provided with a handle portion 8 and a base portion 9. The force used by squeezing the handle 8 to the tool body 9 is generally normal to the cable axis which is to be terminated.

Figure 8:
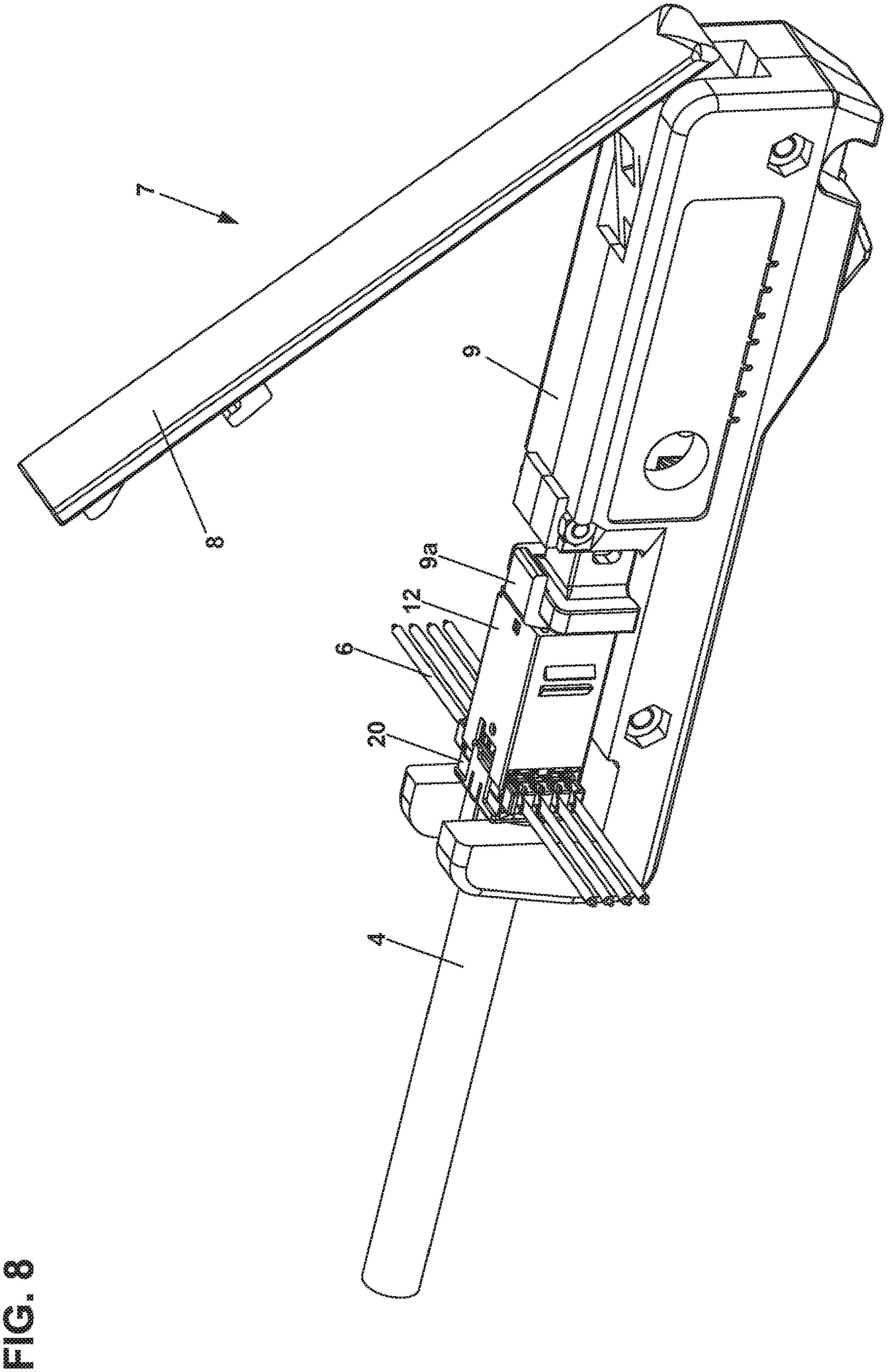
FIG. 8 is a perspective view of the connector and cable shown in FIG. 6 having been installed in the wire termination tool shown in FIG. 7.
Figure 9:
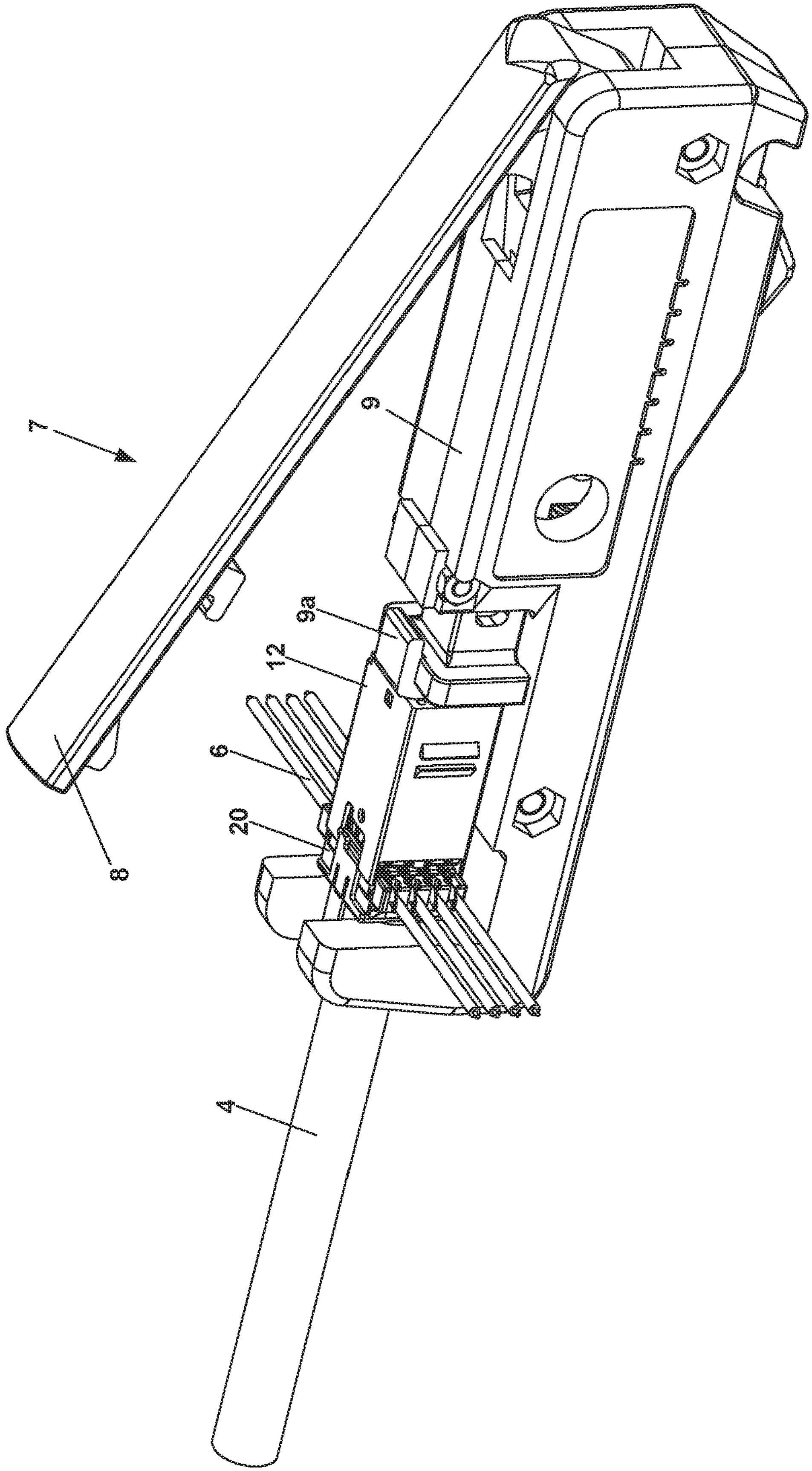
FIG. 9 is a perspective view of the connector and cable shown in FIG. 8, but with the tool being moved towards an extended position.
Figure 10:
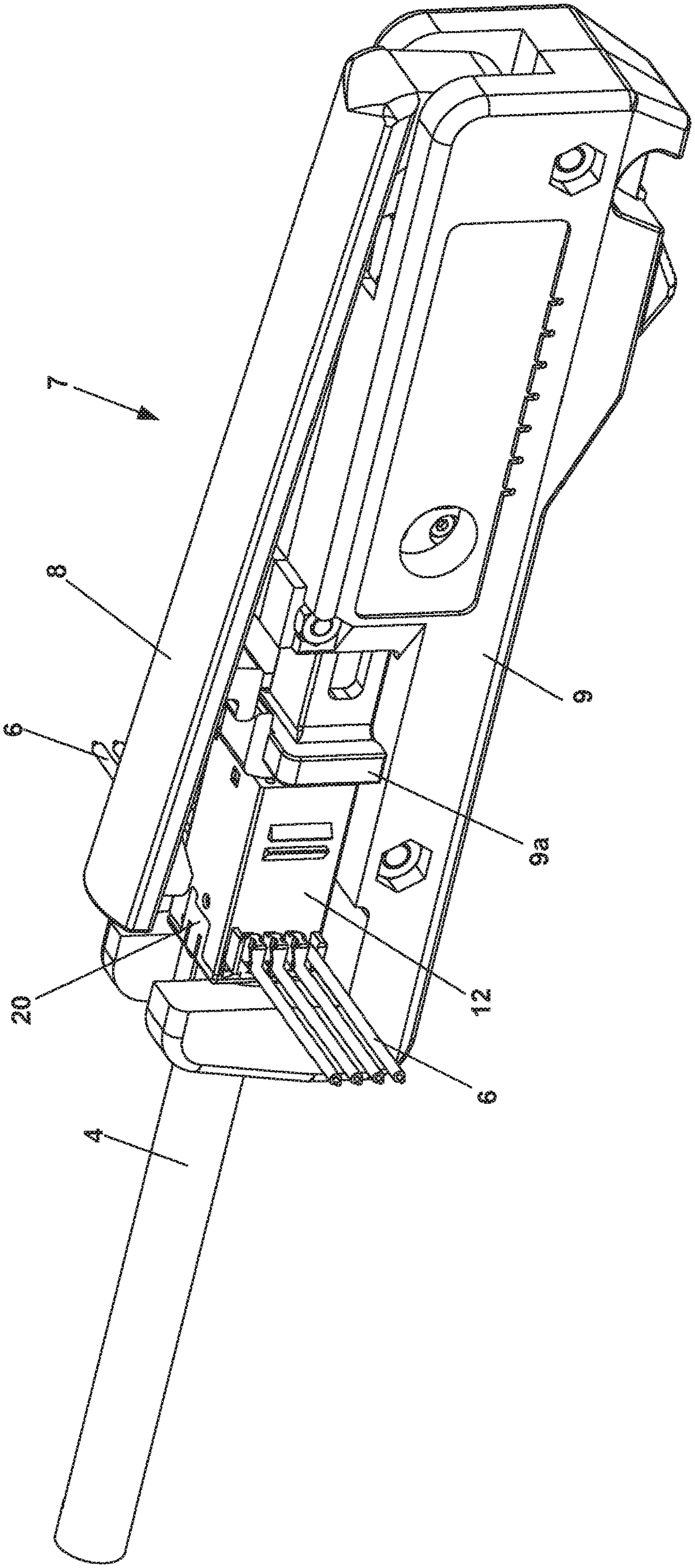
FIG. 10 is a perspective view of the connector and cable shown in FIG. 9, but with the tool being moved into the fully extended position such that the wires of the cable are fully terminated onto the connector, such that the connector part is fully assembled onto the cable manager part and the separable lacing fixture is separated from the cable manager part.

Once the connector part 12 has been initially inserted onto the cable manager part 20, as shown at FIG. 6, the cable manager part 20 and the connector part 12 are then placed in the tool 7, with the tool 7 being in a retracted position. The handle 8 of the tool 7 is then squeezed so that a pusher element **9*a* moves laterally into an extended position and thereby forces the connector part 12 fully into engagement with the cable manager part 20. The body 9 of the termination tool 7 provides the necessary opposing force for the terminal insertion within the connector part 12. As this occurs, each wire 6 is additionally pushed further towards an appropriate slot in one of a plurality insulation displacement contacts in the connector part 12. The operation of the wire termination tool 7 from the retracted position to the extended position is shown sequentially shown from FIG. 8 through FIG. 10, wherein the tool 7 is in the fully retracted position in FIG. 8, is in an intermediate position in FIG. 9, and is in the fully extended position in FIG. 10**.

As the tool 7 is advanced towards the fully extended position, the cutting edges 18 of the connector part 12 also advance towards the breakaway portions 32 and the wires 6 and eventually cut entirely through the breakaway portions 32 and the wires 6. As a result, severed wires **6*a* are formed which are retained onto the separated lacing fixture 24. As can be seen at FIG. 11, the tool 7 has been moved back to the fully retracted position and the terminated cable 2, having a fully connected connector part 12 and cable manager part 20 to form the connector 10, has been removed from the tool 7**.

Figure 11:
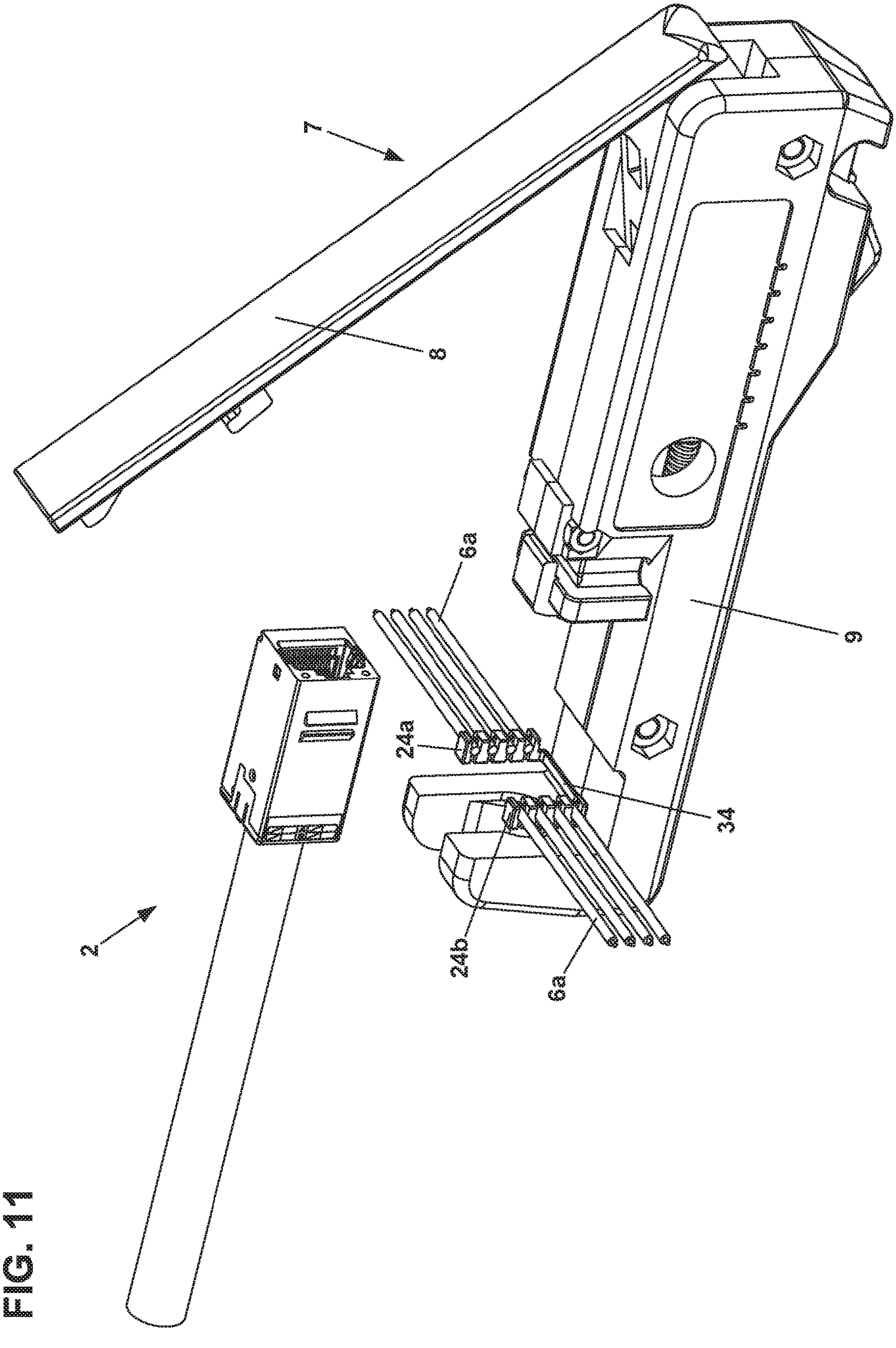
FIG. 11 is a perspective view of the terminated connector and cable shown in FIG. 10 having been removed from the tool, which has been moved back into the retracted position, wherein the separable lacing fixture is shown as having been separated from the cable manager part.
Figure 12:
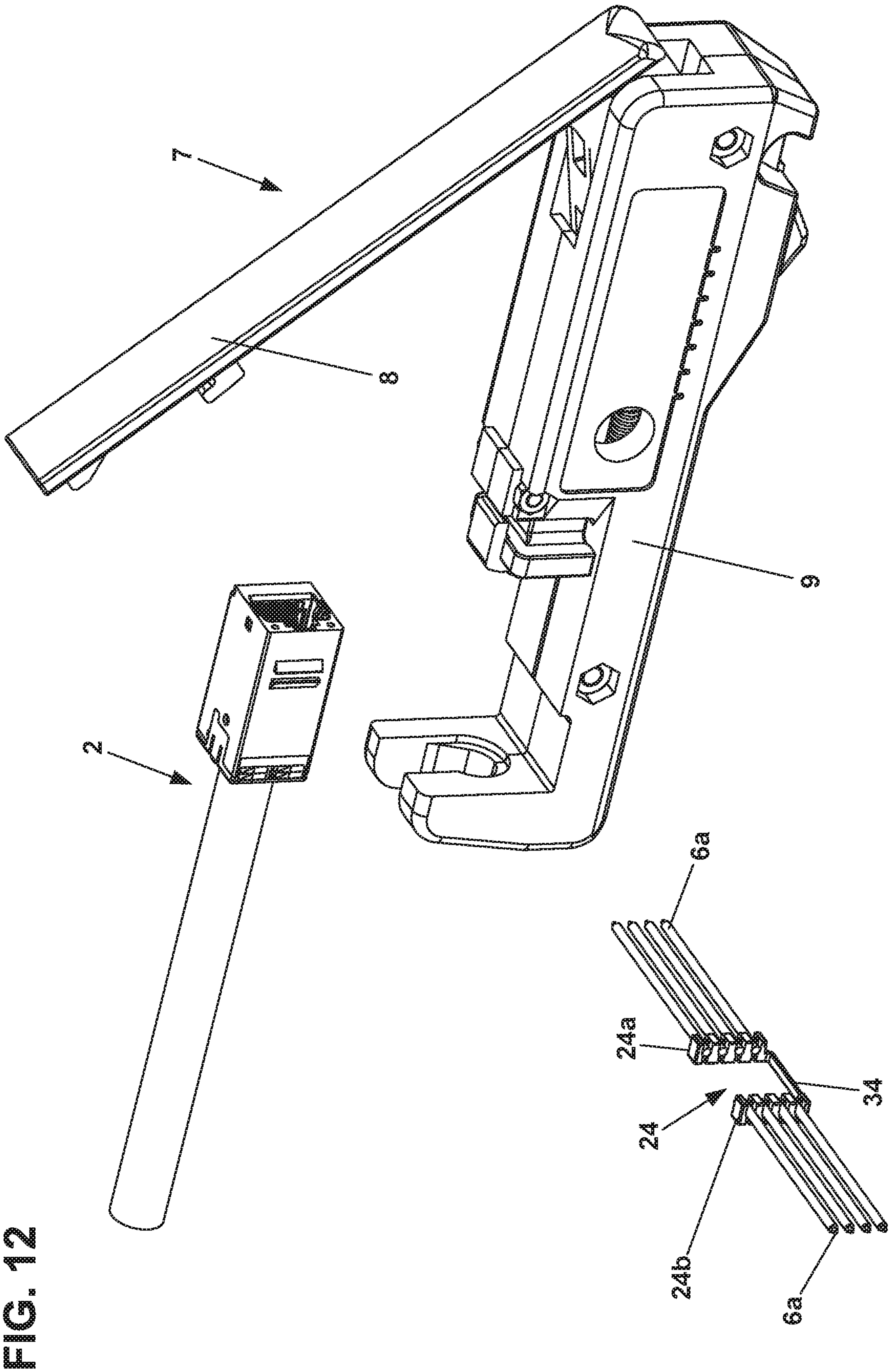
FIG. 12 is a perspective view of the terminated connector and cable shown in FIG. 11, wherein the separable lacing fixture has also been removed from the tool.
Figure 13:
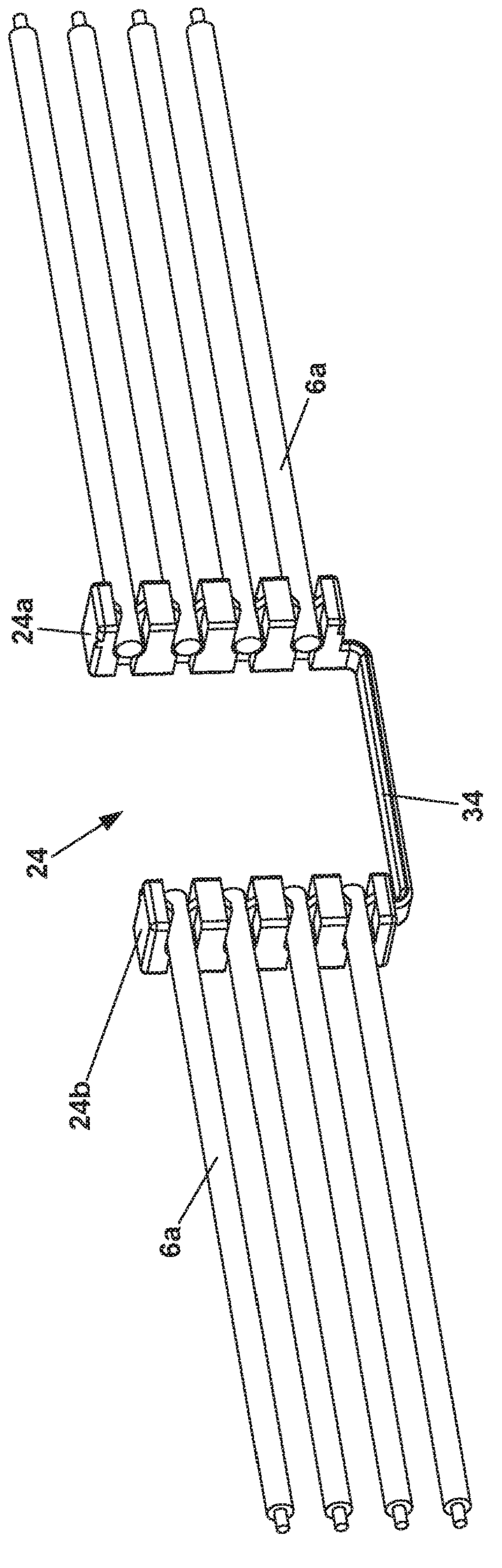
FIG. 13 is a perspective view of the separable lacing fixture and the attached separated wires shown in FIG. 11.
Figure 14:
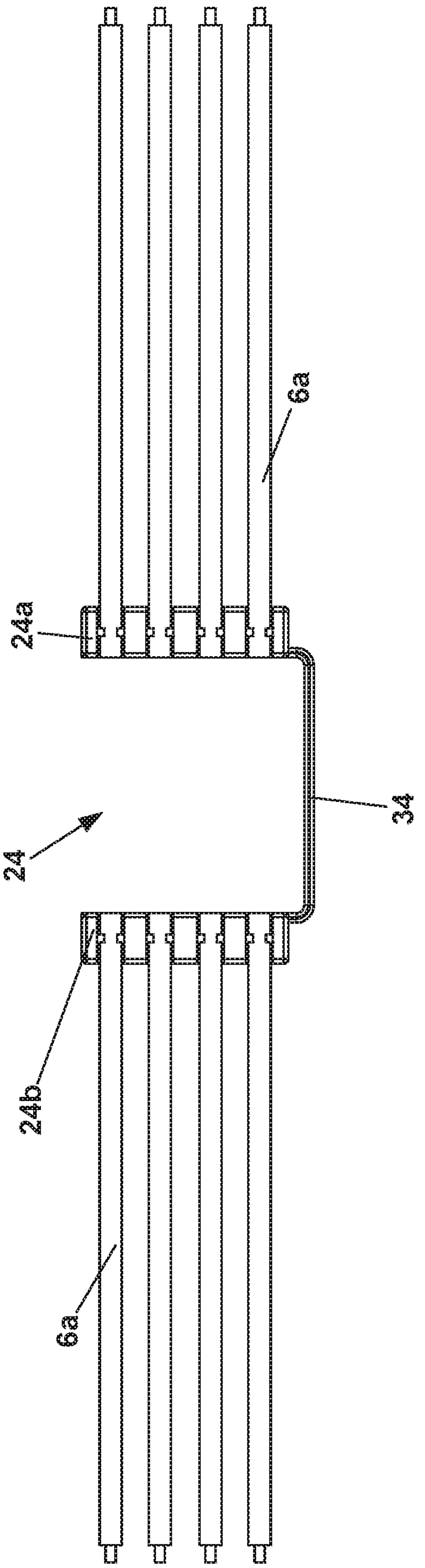
FIG. 14 is a top view of the separable lacing fixture and the attached separated wires shown in FIG. 11.

In addition to holding the portions **24*a*, 24*b* together, the bridge portion 34 of the separable lacing fixture also prevents the separable lacing fixture 24 from being removed from the tool 7 until the terminated cable 2 has also been removed from the tool 7, as shown at FIG. 11. This function is accomplished by virtue of the bridge portion 34 being sandwiched between the tool base portion 9 and the base portion 22 and/or connector part 12 of the connector 10. FIG. 12 shows the separable lacing fixture 24 after being fully removed from the tool 7, at which point the separable lacing fixture 24 and attached wires 6*a*** can be discarded.

Typically, the termination process occurs in the field where the cables 4 are being installed. In such instances, it is common that the excess wires **6*a* created by the termination process are allowed to fall to the floor and must be collected afterwards. When many termination processes are conducted in the same area, a significant number of excess wires 6*a* can accumulate which can be problematic. As such, the above described connector 10 having the separable lacing fixture 24 allows for the excess wires 6*a* to be retained together, whereby the installer can simply discard a single item from the tool 7** with each termination operation.

In one embodiment, the cable manager part 20 can be formed from a polymeric material as a single component, for example, an injection molded plastic component having the separable lacing fixture 24, the main body 22, the bridge portion 34, and the breakaway portions 32. In one example, the base part 22 and the separable lacing fixture 24 are formed together with the breakaway portions 32 being formed as an area of reduced thickness or weakness. Other suitable materials may be used as well, for example a plastic compound filled with metal particles.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

PARTS LIST

2 terminated connector and cable
4 cable
6 wires or filaments
6*a* excess wires
7 termination tool
8 handle portion
9 body portion
9*a* pusher
10 connector
12 connector part
14 jack cavity
16 electrical conductors
18 cutting edges
20 cable manager part
22 main body
24 separable lacing fixture
24*a* first portion
24*b* second portion
26 central aperture
28 main body wire channels
30 lacing fixture wire channels
32 breakaway portions
34 bridge portion

What is claimed is:

1. A connector assembly comprising:
a. a connector part having a jack cavity; and
b. a unitarily formed cable manager part receivable by the connector part at an end opposite the jack cavity, the cable manager part having:
i. a main body defining an aperture for receiving a cable including a plurality of wires, the main body having a first plurality of channels for receiving and retaining each of the wires;
ii. a lacing fixture having a second plurality of channels aligned with the first plurality of channels; and
iii. one or more breakaway portions extending between the main body and the separable lacing fixture, the one or more breakaway portions having a reduced dimension.

2. The connector assembly of claim 1, wherein the one or more breakaway portions represent an area of reduced thickness between the lacing fixture and the main body.

3. The connector assembly of claim 1, wherein the separable lacing fixture includes a first portion and a second portion, each of which is attached to the main body by the one or more breakaway portions.

4. The connector assembly of claim 3, further comprising a bridge portion connecting the first portion to the second portion.

5. The connector assembly of claim 4, wherein the bridge portion is spaced from the main body.

6. The connector assembly of claim 1, wherein the connector part includes cutting edges configured to cut or break the one or more breakaway portions when the connector part is fully installed onto the cable manager part.

7. The connector assembly of claim 1, wherein the first plurality of channels and the second plurality of channels each include eight channels.

8. The connector assembly of claim 1, wherein the aperture has a circular shape.

9. The connector assembly of claim 1, wherein the main body includes a pair of protrusions extending into the aperture.

10. The connector assembly of claim 1, wherein the cable manager part is formed from a polymeric material.

11. A cable manager part configured to be installed within a connector part of a connector, the cable manager part comprising:
a) a single plastic component defining:
i. a main body defining an aperture for receiving a cable including a plurality of wires, the main body having a first plurality of channels for receiving and retaining each of the wires;
ii. a lacing fixture having a second plurality of channels aligned with the first plurality of channels; and
iii. one or more breakaway portions extending between the main body and the lacing fixture, the one or more breakaway portions having a reduced dimension.

12. The cable manager part of claim 11, wherein the one or more breakaway portions represent an area of reduced thickness between the lacing fixture and the main body.

13. The cable manager part of claim 11, wherein the lacing fixture includes a first portion and a second portion, each of which is attached to the main body by the one or more breakaway portions.

14. The cable manager part of claim 13, further comprising a bridge portion connecting the first portion to the second portion.

15. The cable manager part of claim 14, wherein the bridge portion is spaced from the main body.

16. The cable manager part of claim 11, wherein the first plurality of channels and the second plurality of channels each include eight channels.

17. The cable manager part of claim 11, wherein the aperture has a circular shape.

18. The cable manager part of claim 11, wherein the main body includes a pair of protrusions extending into the aperture.

19. The cable manager part of claim 11, wherein the cable manager part is formed from a polymeric material.

20. The cable manager part of claim 11, wherein the lacing fixture includes a first portion located at a first side of the main body and includes a second portion located at a second side of the main body opposite the first side.

* * * * *